Sept. 16, 1952     W. A. BRECHT     2,610,585
LOCOMOTIVE STRUCTURE
Filed Oct. 7, 1947     2 SHEETS—SHEET 1
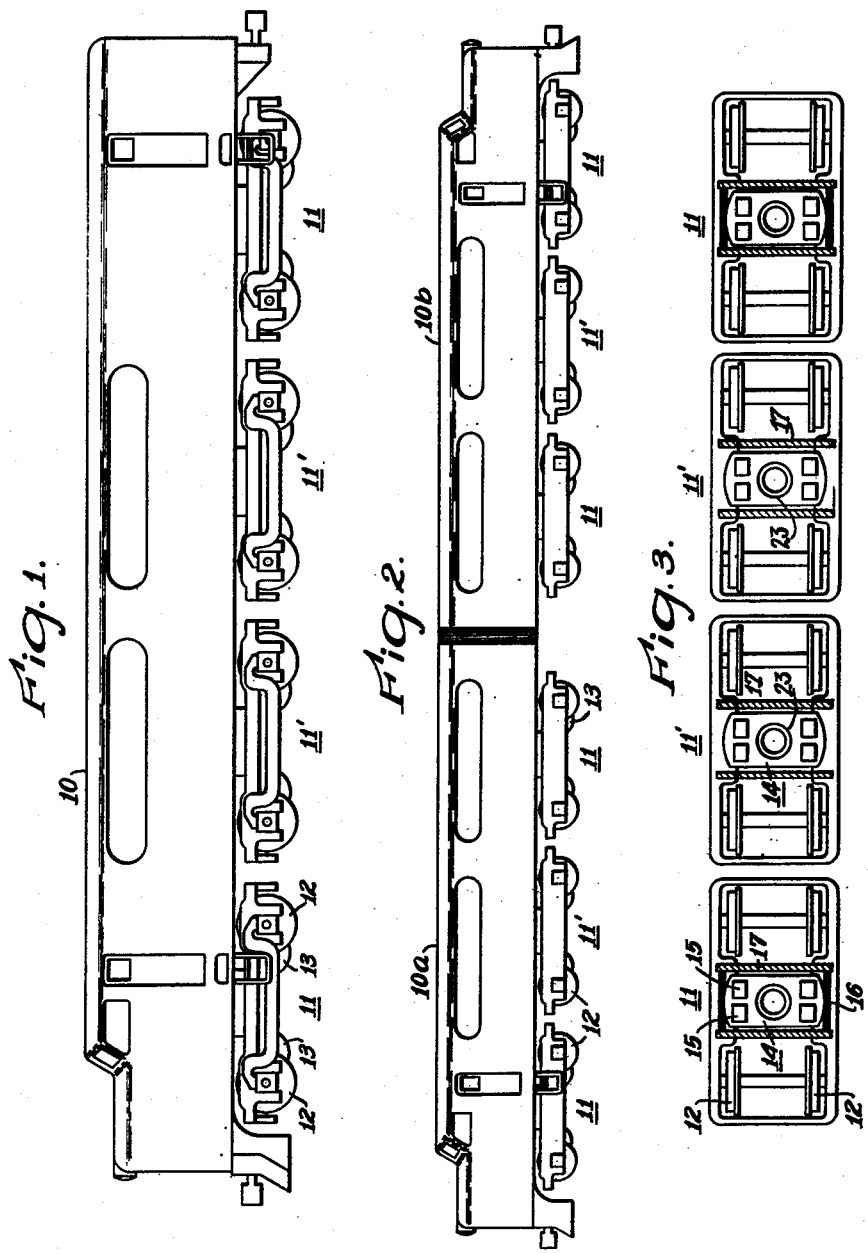
WITNESSES:
Robert C Baird
INVENTOR
Winston A. Brecht.
BY G. M. Crawford
ATTORNEY Sept. 16, 1952 W. A. BRECHT 2,610,585
LOCOMOTIVE STRUCTURE
Filed Oct. 7, 1947 2 SHEETS—SHEET 2
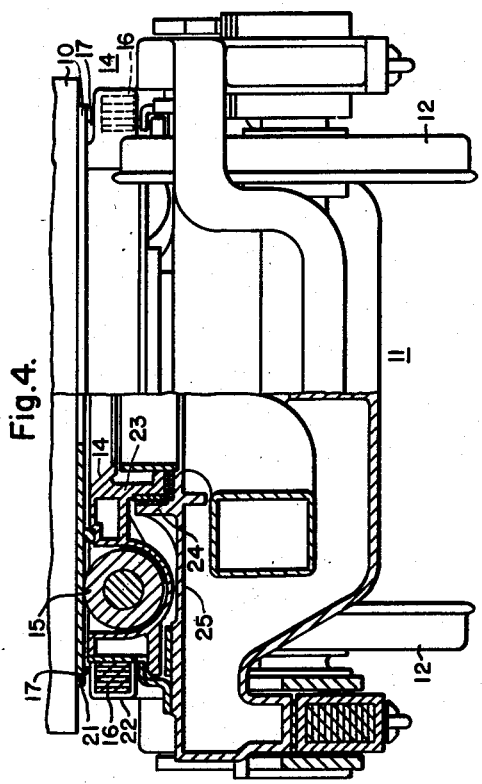
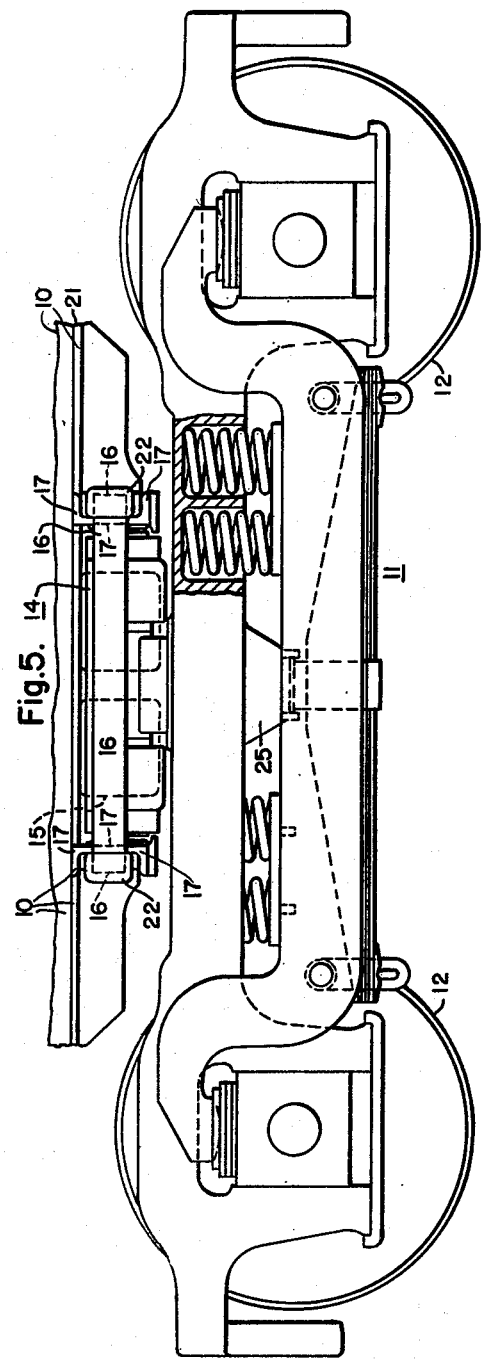
WITNESSES:
INVENTOR
Winston A. Brecht.
ATTORNEY Patented Sept. 16, 1952

2,610,585

UNITED STATES PATENT OFFICE 2,610,585

LOCOMOTIVE STRUCTURE

Winston A. Brecht, Pittsburgh, Pa., assignor to Westinghouse Electric Corporation, East Pittsburgh, Pa., a corporation of Pennsylvania Application October 7, 1947, Serial No. 778,409

8 Claims. (Cl. 105—175)

My invention relates, generally, to locomotive structures and, more particularly, to locomotive running gears.

The usual steam locomotive running gear includes driving wheels and also guiding trucks which are provided to carry weight and improve the tracking characteristics of the locomotive. Electric locomotives have usually followed this practice also since the minimum weight for which they can be designed has usually been greater than that required on the driving axles for adhesion.

The foregoing practice has not been followed by most of the builders of diesel-electric locomotives. A relatively low powered cab (1500 to 2000 H. P.) is mounted on two swivel trucks which may be 4 or 6-wheeled, that is, having two or three axles, having two traction motors on each truck. The most popular unit is a 1500 H. P. unit with two 4-wheeled swivel trucks and four motors. All of the weight on the wheels is, therefore, adhesive weight, and units are combined into 2, 3 or 4-cab locomotives.

This results in locomotives having a much higher ratio of adhesive weight to horsepower than was commonly used on steam or electric locomotives. This has provided large starting and low speed tractive efforts which have proven useful in railroad operation by eliminating helper locomotive service, and has been an important factor in the popularity of the diesel-electric locomotive. However, the multiplicity of cabs has certain disadvantages, one of which is the additional crews required on multi-cab locomotives.

An object of my invention is to provide for mounting a locomotive cab directly on more than two plural-axle swivel trucks, thereby making it possible to increase the horsepower per cab and reduce the number of units in multi-cab locomotives.

Another object of my invention is to provide a locomotive of the swivel truck type which shall be capable of operating at relatively high speeds.

A more general object of my invention is to provide a swivel truck locomotive or other railway vehicle which shall be of a relatively light construction and simple and efficient in operation.

Other objects of my invention will be explained fully hereinafter or will be apparent to those skilled in the art.

In accordance with one embodiment of my invention a locomotive cab rests directly on the center plates of four 4-wheeled trucks, each of which is provided with two traction motors, thereby making the entire weight of the locomotive adhesive weight. The trucks are designed to permit a small amount of restrained lateral movement of the two end trucks and a large amount of unrestrained lateral movement of the two inner trucks to enable the locomotive to negotiate horizontal curves.

For a better understanding of the nature and objects of my invention, reference may be had to the following detailed description, taken in conjunction with the accompanying drawing, in which:

Figure 1 is a view, in side elevation, of a locomotive embodying the principal features of my invention;

Fig. 2 is a view in side elevation of a modification of the invention;

Fig. 3 is a view, in plan, of the running gear for a locomotive of the type shown in Fig. 1, the propelling motors being omitted from the trucks;

Fig. 4 is an enlarged view, partly in section and partly in end elevation of one of the locomotive trucks, and Fig. 5 is an enlarged view, in side elevation, of the truck shown in Fig. 4.

Referring to the drawing and particularly to Figure 1, the locomotive structure shown therein comprises a cab 10, the underframe of which rests directly on the center plates, or center-pin load-carrying carriages 14, of four trucks 11 and 11' which are of the swivel type, each having two or more axles. As shown, each truck has a truck-frame which is provided with four driving wheels 12 and two traction motors 13, thereby utilizing the entire weight of the locomotive as adhesive weight. The motors 13 may be of the well known axle-hung type in which one side of the motor is mounted directly on the axle which it drives.

Since the locomotive cab is mounted directly on more than two trucks, it is necessary to provide trucks having a special bolster construction to permit the locomotive to operate satisfactorily on horizontal curves.

As shown in Figures 3, 4 and 5, each truck is provided with a supporting member or center-pin load-carrying carriage 14 having a plurality of rollers 15, or other lateral-motion mounting-means for mounting the load-carrying carriage for a lateral motion in a horizontal plane, with respect to the vehicle-underframe. Each carriage 14 is shown as being rotatably mounted on its truck-frame, as will be subsequently described, thereby permitting a rotative or swiveling movement, in a horizontal plane, between each truck and the cab. The cab 10 rests directly on the rollers 15, the axes of which are disposed longitudinally of the truck, thereby permitting lateral movements between each of the trucks 11 and 11' and the cab 10. The underframe of the cab 10 is provided with a smooth, horizontal, flat underplate 21, which rests on the rollers 15. If desired, the carriage 14 may be provided with horizontal sliding surfaces in place of the rollers 15, or any other equivalent lateral-motion mounting-means, for supporting the cab 10.

Means are provided for guiding each of the center-pin carriages 14 with respect to the locomotive-underframe, so that each of the carriages which supports said underframe has some freedom of lateral motion, as described, but substantially no longitudinal or swiveling motions in a horizontal plane, with respect to said locomotive-underframe. Any suitable guiding-means may be used to this end. For example, as shown in Figs. 3 and 5, a plurality of pairs of cross-members 17 may be carried by the underframe of the cab 10, for guiding the respective center-pin carriages 14 of the several trucks 11 and 11'.

As shown in Fig. 3, spring members 16 are provided for restraining the lateral movement out of a central position of each one of the two end trucks 11. The spring members 16 are disposed to engage the ends of the center pin carriage 14 and may be mounted in spring shackles 22 which are attached to cross members 17 carried by the cab 10. Since the spring members 16 are carried by the cab structure, the lateral movement between the cab and the center pin carriage 14 and, hence, the truck 11 is restrained by the spring members. In this manner, the lateral movement of the two end trucks 11 may be restrained to approximately two or three inches. The two center trucks 11' are unrestrained by springs, thereby permitting the locomotive to negotiate horizontal curves.

The lateral movements of the center trucks 11' are limited by the rails on which their flanged wheels run.

As shown in Fig. 4, the laterally movable cab-supporting carriage 14 of each of the trucks 11 and 11' is supported on its truck by means of a hollow depending cylindrical center-pin 23, which depends from the carriage 14 and swivels in a well 24 in a cross-member of the truck-frame. In this manner, each cab-supporting carriage 14 is provided with a swiveling mounting-means, for providing a rotating or swiveling motion in a horizontal plane, but substantially no lateral or longitudinal movements in a horizontal plane, with respect to its truck-frame.

Swing bolsters or lateral motion devices of a previously known conventional type, in which the bolsters are mounted on swing links, raise the truck center plate with lateral motion. It will be seen that, if a cab were mounted on more than two swivel trucks of the swing-link type, this would result in increasing the load on the trucks which move the furthest laterally and hence decrease the load on the trucks which do not swing laterally at all, or as far. The foregoing condition does not exist in the present locomotive since the rollers 15 on which the cab rests are not raised by lateral motion of the truck but permit the center plate 14 to remain substantially at the same horizontal level, or height above the rails as it moves laterally. Therefore, the weight of the cab is divided substantially equally between the trucks at all times.

The present invention is not limited to locomotives having a cab mounted on four trucks but may be applied to any number of trucks over two. Thus, as shown in Fig. 2, each cab may be mounted on two end trucks 11 and one center truck 11' and the two cabs 10a and 10b coupled together.

Furthermore, if desired, the trucks may be of the 6-wheeled type instead of the 4-wheeled type as shown in the present drawing. In the structure shown in Fig. 2, the two end trucks 11 for each cab are provided with the lateral restraining means while the center truck 11' is unrestrained.

Some of the advantages of the structure disclosed herein over conventional multi-cab swivel truck locomotives or conventional multi-axle wheel arrangements are:

(1) The mechanical parts are lighter in weight for a given number of driving axles.

(2) The mechanical parts are lower in cost, first, because of lower weight and because of repetitive manufacture of identical trucks.

(3) The maintenance cost is lower when a truck or motor must be repaired. A spare truck can be quickly installed and the locomotive returned to service while the repair work is being done. This locomotive will, therefore, have a higher utilization factor than a locomotive having conventional multi-axle arrangements.

(4) The riding and tracking characteristics obtained with the swivel trucks are comparable to those obtained with locomotives having driving wheels and guiding trucks.

(5) The trucks for 8 axle (4 truck) locomotives and 6 axle (3 truck) locomotives may be identical and interchangeable.

From the foregoing description, it is apparent that I have provided for mounting a locomotive cab directly on more than two swivel trucks in a manner which permits satisfactory operation of the locomotive by providing for the required lateral movement between the locomotive cab and the truck. As explained hereinbefore, the present structure has numerous advantages over previously known structures.

Since certain changes may be made in the above-described construction, such as the interchanging of parts, the addition or omission of parts, and the substitution of equivalents, and hence different embodiments of the invention may be made, without departing from the spirit and scope thereof, it is intended that all the matter contained in the above description and shown in the accompanying drawing shall be considered as illustrative and not in a limiting sense.

I claim as my invention:

1. In a locomotive structure, in combination, at least three swivel trucks for supporting a locomotive cab, each truck having a swiveled and laterally movable cab supporting member, including means for restraining each truck in a longitudinal direction with respect to the cab, said locomotive cab having an underframe resting directly on said supporting members, and resilient means on said cab engaging the supporting member for the end trucks for restraining the lateral movement of the end trucks relative to the cab.

2. In a locomotive structure, in combination, at least three swivel trucks for supporting a locomotive cab, a center pin carriage on each truck, a plurality of rollers in each carriage, means for restraining each truck in a longitudinal direction with respect to the cab, said locomotive cab having an underframe supported directly by said rollers, each of said trucks being movable laterally relative to said cab, and resilient means on said cab engaging the carriages of the end trucks for restraining the lateral movement of the end trucks.

3. In a locomotive structure, in combination, at least three swivel trucks for supporting a locomotive cab, a plurality of rollers in each truck, said rollers having their axes disposed longitudinally of the truck frame, means for restraining each truck in a longitudinal direction with respect to the cab, said locomotive cab having an underframe supported directly by said rollers, each of said trucks being movable laterally relative to said cab, and resilient means attached to the cab for restraining the lateral movement of the end trucks.

4. In a locomotive structure, in combination, at least three swivel trucks for supporting a locomotive cab, a plurality of rollers in each truck, said rollers having their axes disposed longitudinally of the truck frame, means for restraining each truck in a longitudinal direction with respect to the cab, said locomotive cab having an underframe supported directly by said rollers, each of said trucks being movable laterally relative to said cab, and spring means for restraining the lateral movement of the end trucks, and spring shackles for attaching the spring means to the cab.

5. A railway vehicle comprising: a plurality of plural-axle trucks, each having a truck-frame; a vehicle-underframe supported by at least three of such trucks; a separate load-carrying carriage disposed between the truck-frame of each underframe-supporting truck and the supported underframe; a separate pair of mounting-means for mounting each load-carrying carriage with respect to each of its respective associated parts which are its underlying truck-frame and the overlying vehicle-underframe, respectively; one of said mounting-means of each pair being a swiveling mounting-means for mounting its load-carrying carriage for a swiveling motion in a horizontal plane, and for substantially no lateral or longitudinal movements in a horizontal plane, with respect to one of said associated parts; the other of said mounting-means of each pair being a lateral-motion mounting-means for mounting its load-carrying carriage for a lateral motion in a horizontal plane, and for substantially no swiveling or longitudinal movements in a horizontal plane, with respect to the other one of said associated parts, said lateral-motion mounting-means being of a type which keeps its parts on substantially the same horizontal level throughout said lateral motion; and separate resilient means associated with the respective load-carrying carriages of at least the two end-trucks of the underframe-supporting trucks which underlie said vehicle-underframe, each resilient means being disposed between its load-carrying carriage and its associated part for restraining the lateral movement out of a central position.

6. The invention as defined in claim 5, characterized by said resilient means being associated with the respective load-carrying carriages of only the two end-trucks of the underframe-supporting trucks which underlie said vehicle-underframe.

7. The invention as defined in claim 5, characterized by each of the underframe-supporting trucks being electrically driven, and to this end including electric-motor-means for driving each of its axles.

8. The invention as defined in claim 7, characterized by said resilient means being associated with the respective load-carrying carriages of only the two end-trucks of the underframe-supporting trucks which underlie said vehicle-underframe.

WINSTON A. BRECHT.

REFERENCES CITED

The following references are of record in the file of this patent:

UNITED STATES PATENTS

| Number | Name | Date |
|---|---|---|
| 2,071 | Davenport et al. | May 4, 1841 |
| 228,694 | Terry | June 8, 1880 |
| 270,153 | Terry | Jan. 2, 1883 |
| 300,937 | Batchelor | June 24, 1884 |
| 777,575 | Wands | Dec. 13, 1904 |
| 1,008,579 | Batchelder | Nov. 14, 1911 |
| 1,271,682 | Eaton | July 9, 1918 |
| 1,511,064 | Priest | Oct. 7, 1924 |
| 1,574,998 | Pendleton et al. | Mar. 2, 1926 |
| 2,239,658 | St. John | Apr. 22, 1941 |